(No Model.)
C. E. BULKLEY.
VEHICLE WHEEL.
No. 593,763. Patented Nov. 16, 1897.
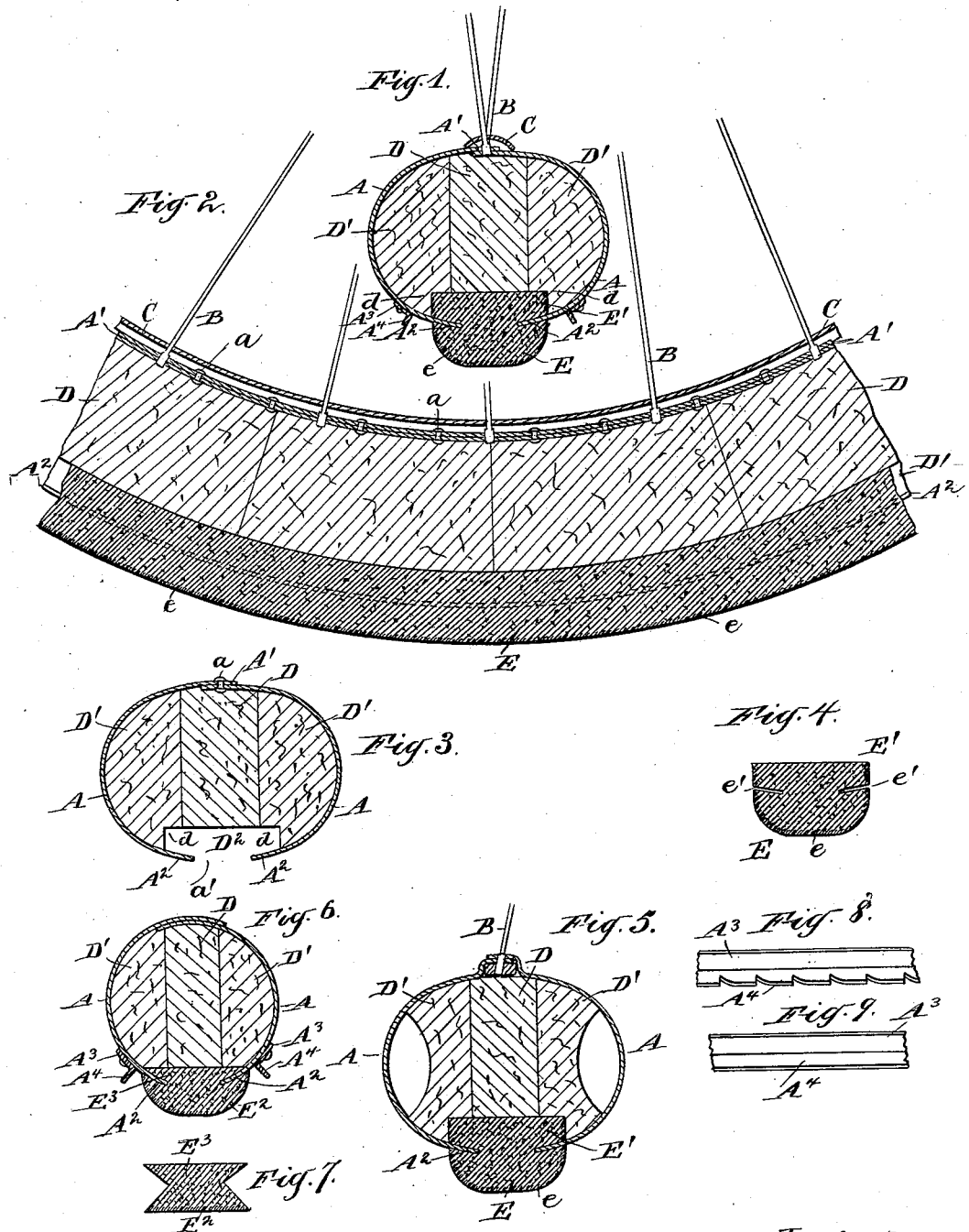
Witnesses:
Alexander C. Connor
W. H. Connor
Inventor:
Charles E. Bulkley
by his attorney
Charles R. Searle.

UNITED STATES PATENT OFFICE.

CHARLES E. BULKLEY, OF SUMMIT, NEW JERSEY.

VEHICLE-WHEEL.

SPECIFICATION forming part of Letters Patent No. 593,763, dated November 16, 1897.

Application filed March 23, 1897. Serial No. 628,815. (No model.)

*To all whom it may concern:*

Be it known that I, CHARLES E. BULKLEY, a citizen of the United States, residing at Summit, in the county of Union and State of New Jersey, have invented a certain new and useful Improvement in Vehicle-Wheels, of which the following is a specification.

The invention relates particularly to the construction of the outer portion or rim and tread and is intended to serve as a substitute for the pneumatic tires now generally employed on the wheels of bicycles, sulkies, and other light vehicles. It consists of a rim formed of two concavo-convex rings applied together to form an annulus, having an open slot along the line of the tread and receiving the spokes on the opposite inner line. The interior of the annulus is reinforced by a filling of cork or analogous material, also serving as a backing for the tread. The latter is preferably of rubber, having a cellular structure similar to commercial "sponge rubber," and is held in the peripheral slot in the rim by engaging the free edges of the annulus in deep narrow grooves or cuts produced on the sides of the tread.

By the use of my invention a wheel is produced having a high degree of resiliency, combined with lightness, strength, and great durability.

The accompanying drawings form a part of this specification, and represent what I consider the best means of carrying out the invention.

Figure 1 is a cross-section through the rim and tread. Fig. 2 is a corresponding longitudinal section of a portion. Fig. 3 is a cross-section of the rim without the tread. Fig. 4 is a cross-section through the tread alone. Fig. 5 is a section corresponding to Fig. 1, but showing a modified form. Fig. 6 is a similar view showing still another form. Fig. 7 is a section of a modified form of the tread alone. Figs. 8 and 9 show side views of two forms of antislipping-rings projected in straight lines.

Similar letters of reference indicate like parts in all the figures.

A A are the concavo-convex rings, forming the main body of the wheel-rim. They are of thin resilient metal, preferably steel, joined along the inner line by lapping the edges, as at A', and held by brazing or by the rivets $a$, or both, producing a hollow annulus of circular or slightly-elliptic cross-section, as shown. The lapping supplies the required thickness of metal, in which are set the spokes B, and the junction of the latter and also the line of rivets $a$ are concealed within an ornamental covering-ring C, of aluminium or other suitable light material.

The free edges $A^2$ $A^2$ of the rings A are separated to form a continuous open peripheral slot $a'$ of sufficient width to admit the segmental pieces of cork, nearly or quite filling the whole interior of the annulus. For convenience in passing the segments through the slot the cork is preferably in three ring-sections, the outer ones, D' D', having rounded outer faces to match to the inner faces of the rings A A, against which they lie, while the intermediate ring D is plane on both faces and fits closely in the space between the others. The cross-section of the ring D is shorter in vertical height than the rings D', and the latter are notched at $d$ to provide an annular space $D^2$ within the edges $A^2$ $A^2$, in which is received and held the locking portion E' of the tread E. The tread is preferably of soft vulcanized rubber having a cellular structure analogous to the form known as "sponge rubber." It is provided during the process of manufacture with a surface $e$, less porous than the main body, to afford a better wearing face, and has a deep cut or narrow groove $e'$ on each side, dividing the tread into the two portions E and E', the former adapted to contact with the ground and the latter serving as the locking-piece, connecting the tread to the rim by the engagement of the lips or free edges $A^2$ in the cuts $e'$ and being itself forced into the annular space provided for that purpose in the cork filling. The rings forming the annulus, the cork filling, and the sponge-rubber tread contribute collectively and individually to the resiliency. Very small obstructions encountered in the road are simply embedded in the portion E of the tread without transmitting any vibration to the other parts. As the obstructions are greater or the load is increased the pressure is transmitted to the whole tread E E' and through the large area of the latter portion to the less-easily compressed cork filling. The free edges $A^2$ of the annulus are also deflected upward and inward, and in severe shocks under a heavy load the resilient properties of the cork filling are called into action to yieldingly resist further compression.

The invention supplies a wheel possessing the resiliency of the pneumatic tire, avoiding its ever attendant danger of puncture and consequent failure, and at considerably less cost.

$A^3$ are continuous rings of metal, preferably steel, riveted to the free edges $A^2$ near the tread and serving to support the wheel against slipping laterally when greatly inclined. The rings are L-shaped in cross-section, one member lying against the outer face of the free edge and the other, $A^4$, extending radially outward. The edge $A^4$ may be serrated, as in Fig. 8, or smooth, as in Fig. 9, as may be preferred, or one wheel of a bicycle may be equipped with one form and the other applied on the other wheel.

The rim A being of metal allows the rings $A^3$ to be reliably attached thereto near the tread E, and as the latter flattens under pressure are brought so nearly in contact with the ground as to be ready to serve so soon as the angle of lateral inclination becomes dangerous and thereby prevent the wheel from slipping in turning curves of short radius.

Modifications may be made in the forms and proportions and in the details of construction.

Fig. 5 shows a form in which the lapped joint $A'$ is offset outwardly, the space thus formed being filled with an annulus of hard wood adapted to receive and hold the spoke ends. In this modification the outer segments $E'$ of the cork filling are hollowed on the rounded faces to impart greater resiliency and also lighten the rim.

In the modification shown in Fig. 6 the rim is represented as circular in cross-section, but the main difference is in the tread, which is, as shown in Fig. 7, provided with a deep V-groove on each side, receiving the free edges $A^2$. The upper portion $E^3$ fills the space within the rim unoccupied by the cork, and the portion $E^2$, serving as the tread proper, is coated with the cement along the exposed part of the V-groove and turned up and secured to the adjacent surface of the free edge $A^2$, producing the half-elliptic form shown.

I claim—

1. In a vehicle-wheel, a hollow annulus or rim having a continuous open slot on the line of the tread, the free edges and side walls serving as springs, in combination with an annular tread held in said slot by engaging said free edges, and a filling of light resilient material within said annulus, serving to reinforce the latter and said tread, all substantially as herein specified.

2. In a vehicle-wheel, a hollow annulus or rim formed by two concavo-convex rings lapped and joined along the inner line and having a continuous open peripheral slot on the line of the tread between the free edges of said rings, in combination with an annular tread having narrow grooves on the sides and held in said slot by the engagement of said grooves with said free edges, and a filling of light resilient material as cork within said annulus, introduced through said slot and serving to reinforce the rim and tread, all substantially as herein specified.

3. In a vehicle-wheel, a hollow annulus or rim formed by two concavo-convex rings lapped and joined along the inner line and having a continuous open peripheral slot on the line of the tread between the free edges of said rings, in combination with a tread of sponge rubber having an outer wearing surface thereon and narrow grooves on the sides, engaged by said free edges and thereby held in said slot, and a filling of cork in the form of short segments introduced through said slot and arranged in layers within said annulus, all substantially as herein specified.

4. The concavo-convex rings A, lapped and joined at $A'$ and having the slot $a'$ between the free edges $A^2$ of said rings on the line of the tread, in combination with the cork rings D, $D'$ having the space $D^2$, and the tread of sponge rubber comprising the two portions E, $E'$, the former serving as the tread of the wheel and the latter received in said space and held in engagement with the rim by the said free edges entered in the narrow grooves $e'$ on the sides of the tread, all substantially as herein specified.

5. The concavo-convex rings A, lapped and joined at $A'$ and having the slot $a'$ between the free edges $A^2$ of said rings on the line of the tread, in combination with the cork rings D, $D'$ having the space $D^2$, and the tread of sponge rubber comprising the two portions E, $E'$, the former serving as the tread of the wheel and the latter received in said space and held in engagement with the rim by the said free edges, and the rings $A^3$, $A^4$ carried by the said free edges near said tread, all substantially as and for the purposes herein specified.

In testimony that I claim the invention above set forth I affix my signature in presence of two witnesses.

C. E. BULKLEY.

Witnesses:
W. E. DOWD,
THOS. TREMEARNE.